(12) United States Patent
Meissner

(10) Patent No.: US 9,616,601 B2
(45) Date of Patent: Apr. 11, 2017

(54) DISC-SHAPED RETAINING DEVICE FOR BUSHINGS OF A ROTARY TABLET PRESS

(71) Applicant: Fette Compacting GmbH, Schwarzenbek (DE)

(72) Inventor: Friedrich Meissner, Schwarzenbek (DE)

(73) Assignee: FETTE COMPACTING GMBH, Schwarzenbek (DE)

( * ) Notice: Subject to any disclaimer, the term of this patent is extended or adjusted under 35 U.S.C. 154(b) by 884 days.

(21) Appl. No.: 13/762,111

(22) Filed: Feb. 7, 2013

(65) Prior Publication Data
US 2013/0216640 A1    Aug. 22, 2013

(30) Foreign Application Priority Data
Feb. 8, 2012    (DE) .................. 10 2012 002 361

(51) Int. Cl.
B29C 43/32    (2006.01)
B30B 11/08    (2006.01)
B30B 15/02    (2006.01)

(52) U.S. Cl.
CPC .............. *B29C 43/32* (2013.01); *B30B 11/08* (2013.01); *B30B 15/026* (2013.01)

(58) Field of Classification Search
CPC ....... B30B 11/08; B30B 15/026; B30B 11/00; B30B 11/006; B30B 15/08; B30B 11/02; B30B 11/14; B30B 11/04; B29C 43/08; B29C 2043/3283; B29C 43/32; A61K 9/2095; A61K 9/20
USPC .................................. 425/344–345, 352–355
See application file for complete search history.

(56) References Cited

U.S. PATENT DOCUMENTS 2,798,443 A * 7/1957 Martell ................. B30B 11/085
                                                     425/112
5,266,017 A * 11/1993 Bliss ....................... B30B 11/08
                                                     425/193

FOREIGN PATENT DOCUMENTS

| DE | 19635186 A1 * | 3/1998 | ............. B30B 11/08 |
| DE | 10159114 | 6/2003 | |
| DE | 102010010209 | 9/2011 | |
| GB | 2462454 | 2/2010 | |
| JP | H06145707 A * | 5/1994 | |
| JP | 2003311493 | 11/2003 | |
| JP | 2006150405 | 6/2006 | |

OTHER PUBLICATIONS

Duane Miller. Designing Welded Lap Joints. Welding Innovation. vol. XVII. No. 3. 2001.*
Machine Translation of JP 2006150405 A.*
Machine Translation of DE 16935186 A1.*
Machine Translation of JPH06-145707A.*

* cited by examiner

*Primary Examiner* — Matthew Daniels
*Assistant Examiner* — Leith S Shafi
(74) *Attorney, Agent, or Firm* — Vidas Arrett & Steinkraus

(57) ABSTRACT

The invention concerns a disc-shaped retaining device for bushings of a rotary tablet press, wherein the disc-shaped retaining device comprises two disc halves that are connected with one another, each of which shows multiple holes, which align with one another if the disc halves are connected with one another and thus form mounting holes in which one respective bushing is located, wherein the bushings between the disc halves that are connected with one another are designed in a form-fit manner.

11 Claims, 3 Drawing Sheets

DISC-SHAPED RETAINING DEVICE FOR BUSHINGS OF A ROTARY TABLET PRESS

CROSS-REFERENCE TO RELATED APPLICATIONS

Not applicable

STATEMENT REGARDING FEDERALLY SPONSORED RESEARCH

Not applicable

BACKGROUND OF THE INVENTION

The invention relates to a disc-shaped retaining device for bushings of a rotary tablet press, in particular a die table for die bushings of a rotary tablet press. Segmented and unsegmented die tables are known. A segmented die table, i.e. a die table for a rotary tablet press constructed of multiple die segments, especially annular die segments, is, for example, known from DE 101 59 114 B4, the entire contents of which is incorporated herein by reference. In the case of said die table, the upper and lower punches directly interact with boreholes of the die segments. Sometimes it is desired to place sleeve-like die bushings in the die holes, within which pulverised material is pressed into tablets between the upper and lower punches during operation. Such die bushings are fixed, for example, through bonding, shrinking, impression or screwing. When they are screwed, generally radial attachment screws are applied to the die bushings.

The known types of fastening for the die bushings do not always, however, reliably sustain the great forces that occur during operation. The latter in particular does apply to non-form-fit connections. With screwed bushings, for example, due to exposed screw threads, gaps and hollows, difficulties occur with regard to cleaning pulverised material which inevitably occurs during operation. Bonded bushings require an adhesive, which—in particular when manufacturing tablets for the pharmaceuticals industry—need to fulfil high approval requirements, for example those of the U.S. Food and Drug Administration (FDA). Furthermore, an increased space requirement arises through the known types of fastening, which leads to restrictions in regard to the number of die bushings to be accommodated and the size of the tablet formats to be manufactured. The known die tables or die segments can, moreover, depending upon the type of fastening, only be used for the die bushings on one side.

Taking as a starting point the prior art explained, the task of the invention is to provide a disc-shaped retaining device of the kind mentioned at the beginning, in which bushings can be fastened in a simple, compact and secure manner.

The invention resolves this task through the subject of claim 1. Advantageous designs can be found in the dependent claims, the description and the figures.

The invention resolves the task by means of a disc-shaped retaining device for bushings of a rotary tablet press, characterised in that the disc-shaped retaining device comprises two disc halves that are connected with one another, each of which shows multiple holes, and which align with one another if the disc halves are connected with one another and thus form mounting holes into which one respective bushing is placed, wherein the bushings between the disc halves that are connected with one another are designed in a form-fit manner. The disc-shaped retaining device may in particular be a die table. Accordingly, the bushings may in particular be die bushings.

BRIEF SUMMARY OF THE INVENTION

The disc-shaped retaining device according to the invention may, for example, have an annular shape. When the rotary press is switched on, the disc-shaped retaining device is driven around its axis, which usually runs vertically. According to the invention, the disc-shaped retaining device is partitioned horizontally into two disc halves, which are, in an appropriate manner, connected with one another to form the disc-shaped retaining device, in particular a die table. Thus, the disc halves form the disc-shaped retaining device, especially a die table of a rotary tablet press. The disc halves each show a large number of axial boreholes, which are usually arranged behind one another along a circular path. In the state in which the disc halves are fitted together, the boreholes of one disc half each form a large number of axial mounting holes, especially die holes, together with the boreholes of the other disc half. According to the invention, in addition a sleeve-like bushing, especially a die bushing, is arranged in each of the mounting holes, with pulverised material being pressed into tablets in the bushings when the device is subsequently operated. The bushings are each designed in a form-fit manner, for instance in a clamped fashion, between the disc halves that are connected with one another. The bushings can fully extend through to the opposite side of the two disc halves. They may, for example, have a cylindrical form.

Through the disc-shaped retaining device being partitioned into two disc halves, according to the invention, and the bushings being incorporated between these two disc halves in a form-fit manner, the bushings are in particular secured against movement in their axial direction. Thus, a form fit in an axial direction exists, which is bound to withstand the very strong forces occurring when a rotary tablet press is operated. In the process, the bushings are in particular solely held in their required position by being incorporated between the disc halves in a form-fit manner. No further fastening measures for the bushings are necessary. Furthermore, through the bushings being fastened according to the invention, only a small amount of space is required in the border region of the disc-shaped retaining device. As a result, a greater number of mounting holes and bushings can be provided for. In addition, greater flexibility exists with regard to the tablet formats manufactured.

Moreover, the fastening of the bushings according to the invention by partitioning the disc-shaped retaining device in a horizontal direction leads to cost savings in the manufacturing process. That means that the bushings can already be inserted when the components are still in their unprocessed state. The bushings, and, in particular, their through-holes for receiving the pulverised material to be pressed and/or their surfaces, can be processed in the state in which they are already assembled in the disc halves. The cleaning is also made easier, as no apertures exist, as opposed to, for instance, in the case of bushings already screwed in place. The bushings may nonetheless be replaced by other bushings by detaching the disc halves from one another. Finally, due to the bushings being fastened according to the invention, it is also conceivable for the disc-shaped retaining device to be used on both sides.

According to one design, the disc-shaped retaining device may be constructed of several disc segments, wherein the disc halves are each formed out of multiple segment halves, wherein each connected pair of segment halves forms a disc segment. In such a design, the disc-shaped retaining device is formed out of several disc segments, for example annular ones, especially die segments. The disc segments may each form an annular section, so that, in their assembled state, they form an annular disc-shaped retaining device. Multiple boreholes are then arranged in the segment halves forming the disc segments, which align in the case of segment halves that are connected with one another and thus form the mounting holes, which each contain a bushing. The bushings are therefore designed in a form-fit manner between the segment halves that are connected with one another.

According to a further embodiment, the bushings may each include a collar, which is incorporated into a receptacle corresponding to the collar, in particular in a form-fit manner. The collars may each run along the circumference of the bushings, for example in the centre. They may be designed in tiers. The receptacles may each be arranged in at least one of the disc halves or segment halves that are connected with one another. The receptacles can in particular be arranged in both respective disc halves or segment halves, for example in the area of their borehole ends facing one another. It is, however, also possible for the receptacles to only be located in one of the two disc halves or segment halves that are connected with one another. For example, the receptacles may each be designed in the form of a tiered extension, in particular a cross-sectional extension or an extension across the diameter, of the boreholes of one of the respective disc halves or segment halves that are connected with one another in the region of their borehole end facing the other disc half or segment half.

The disc halves or segment halves may each be directly connected with one another. It is, however, also possible to place at least one respective intermediate layer between the disc halves or segment halves. It is obvious that the intermediate layers then likewise have boreholes that align with the aligning boreholes of the disc halves or segment halves, so that the bushings can also be inserted through the entire intermediate layer. The intermediate layers may each form a seal between the disc halves or segment halves. They especially prevent an air gap between the disc halves or segment halves. In this respect, it is advantageous if the intermediate layers are elastic. For instance, the intermediate layers may consist of a plastic or a metal material, in particular a softer metal material than the metal material of which the disc halves or segment halves consist. According to a further design, the receptacles may each be arranged in the intermediate layers, especially by a respective recess. In the simplest case, the boreholes of the intermediate layers may have a greater diameter than the boreholes of the disc halves or segment halves. The bushings can then, in turn, each be incorporated into such extensions formed by the boreholes of the intermediate layer with their respective collars.

The disc halves or segment halves that are connected with one another can be of the same thickness. Thus, the disc-shaped retaining device or disc segments may be partitioned centrally into the disc halves or segment halves. Alternatively, the disc halves or segment halves connected with one another may be of different thicknesses. The disc-shaped retaining device or the disc segments may also be partitioned eccentrically.

The disc halves or segment halves may each be detachably connected with one another. According to a further design, the disc halves or segment halves may each be connected with one another in a force-closed manner. This may, for example, be through a screw joint or a riveted connection. In addition, or alternatively, the disc halves or segment halves may also respectively be connected with one another by means of a bonded connection, for example a welded connection.

According to another design, means for preventing the bushings from rotating in the mounting holes may be provided for. With this design, the bushings are thus secured against rotating around their axis or the axis of the mounting holes. The latter can, for example, be achieved by the exteriors of the bushings and the interiors of the mounting holes each, at least sectionally, not being rotationally symmetrical. For instance, at least one respective protrusion running in an axial direction or at least one respective recess running in an axial direction on the exteriors of the bushings may be provided for, wherein at least one respective recess running in an axial direction or at least one respective protrusion running in an axial direction is provided for on the interiors of the mounting holes, wherein said at least one protrusion and said at least one recess are interlocked with one another. With this design, thus at least one respective axial spring key is provided for on the bushings or the mounting holes assigned to them, which is incorporated into a corresponding axial groove in the mounting holes or the bushings. With this embodiment, a form fit in the rotational direction of the bushings around their axis therefore likewise exists. It is also, for example, possible for a respective collar of the bushings to have a flat portion, and for a respective receptacle for the collar of the bushings to at least have a corresponding flat portion. Also with this embodiment, by the flat portions interlocking in the assembled state of the bushings, a form fit in the rotational direction of the bushings around their axes is achieved.

The invention also concerns a rotor for a rotary tablet press, comprising a disc-shaped retaining device according to the invention, which is, for example, attached, by means of a fastening device to the rotor, and comprising upper and lower punches, that interact with the bushings during operation of the rotary tablet press, in order to press pulverised material filled into them into tablets. The two disc halves or segment halves may each be detachably fastened to the rotor. It is, however, also possible for one of the disc halves or the segment halves forming such disc halves to be permanently connected to the rotor, while the other disc half is, or the segment halves forming such disc half are, detachably attached to the rotor. Thus, with this design, the upper or lower disc half is firmly attached to the rotor, while the other respective disc half can be detached from the rotor for exchanging bushings.

BRIEF DESCRIPTION OF THE SEVERAL VIEWS OF THE DRAWINGS

Embodiments of the invention are illustrated and explained in more detail below based on figures. Schematically, in the figures

DETAILED DESCRIPTION OF THE INVENTION

Figure 1:
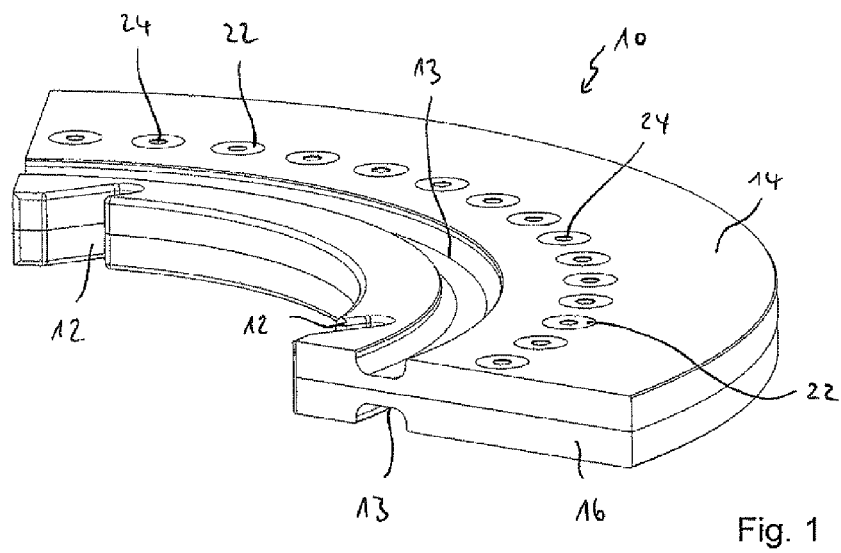
FIG. 1 shows a die segment of a die table designed according to the invention as per a first embodiment, represented from a perspective view.
Figure 2:
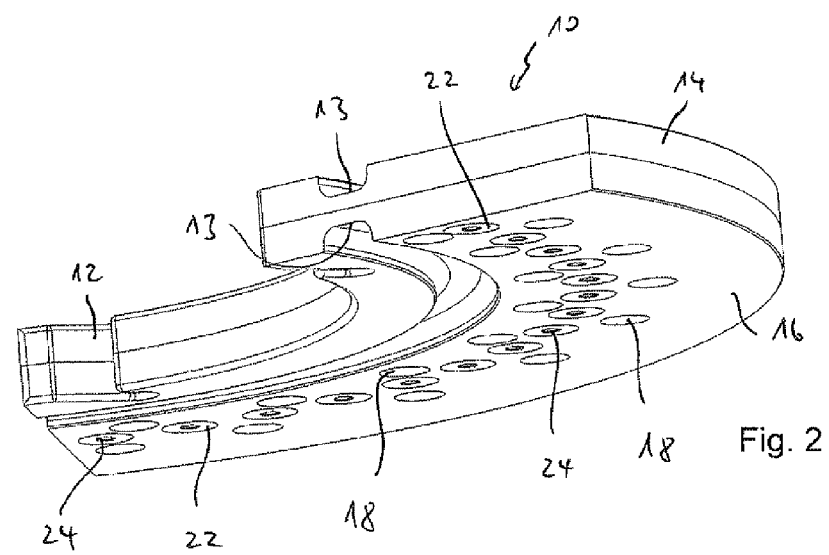
FIG. 2 shows the die segment from FIG. 1 shown in a further perspective representation.
Figure 3:
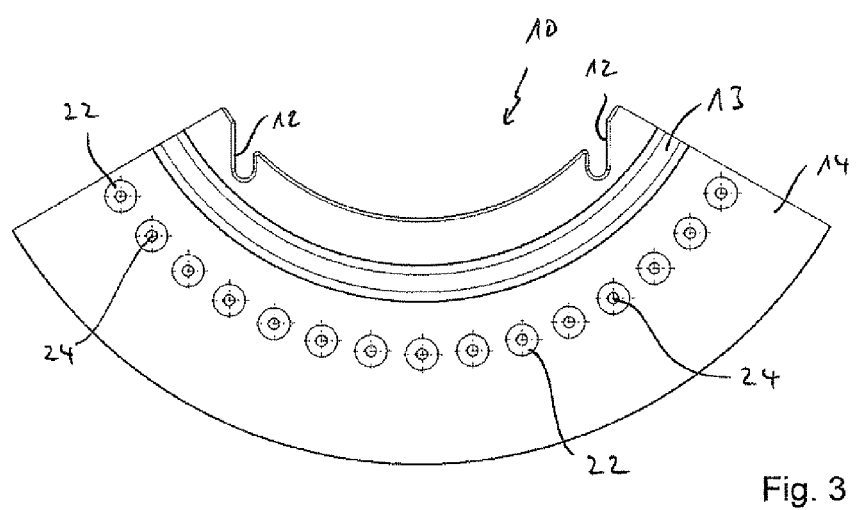
FIG. 3 shows the die segment from FIG. 1 viewed from above.
Figure 4:
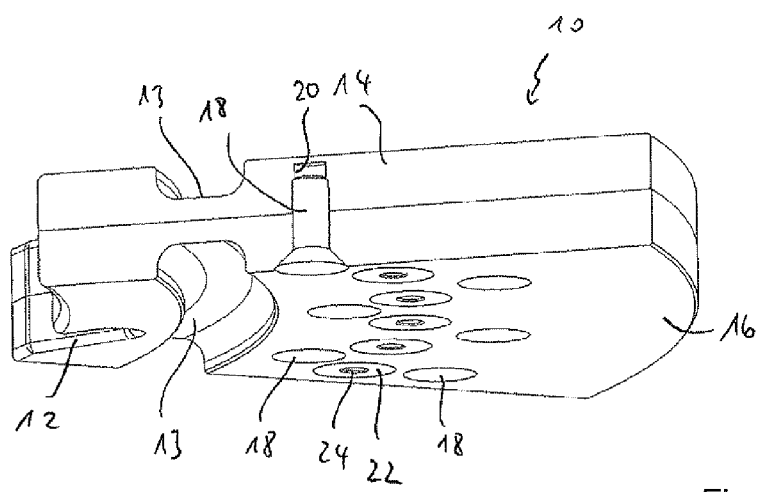
FIG. 4 shows a perspective sectional view through the die segment from FIG. 1.

While this invention may be embodied in many different forms, there are described in detail herein a specific preferred embodiment of the invention. This description is an exemplification of the principles of the invention and is not intended to limit the invention to the particular embodiment illustrated.

Unless anything to the contrary is specified, the same reference numbers designate the same items in the figures. In FIGS. 1 to 6, an annular section of a die segment 10 forming a die table according to the invention is shown. The die table according to the invention shown in the figures comprises multiple such die segments 10, which are put together to form the annular die table according to the invention in a way generally known. The remaining die segments of the die table, not shown, are designed in an identical manner to the die segment shown in FIGS. 1 to 6. At its inner circumference, the die segment 10 features a fastener 12 for fastening the die segments to a rotor of a rotary press. As such fasteners are generally known, they do not need to be elaborated on any further. Moreover, the die segment 10 has rotating upper and lower guide grooves 13, both in an annular form.

The die segment 10 has an upper segment half 14 and a lower segment half 16. As can in particular be discerned from FIGS. 1 and 2, the segment halves 14, 16 are of the same thickness and are, in addition, designed in a largely symmetrical way. The segment halves 14, 16 are detachably connected with one another through multiple threaded bolts 18 screwed through the lower segment half 16 into the upper segment half 14. For instance, it can be discerned in FIG. 2 that the screw connections are effected by means of multiple threaded bolts 18 located along two circular paths, each having a different radius. At least the upper segment half 14 shows the threaded holes 20 assigned to the threaded bolts 18, with the threaded bolts 18 being held in the threaded holes 20.

Furthermore, the segment halves 14, 16 each have multiple axial boreholes 21 placed behind one another along a circular path, which align with one another in the state of the segment halves 14, 16 being connected with one another, and which, through both segment halves 14, 16, form die holes running through the latter in an axial direction. Said axial direction usually runs in a vertical direction. A sleeve-like, cylindrical die bushing 22 is inserted into the respective die holes. The die bushings 22 each extend in an axial direction through the entire die segment 10. They each feature a central passage aperture 24, in which, as is generally known, tablets can be pressed out by the upper and lower punches during operation of the rotary tablet press.

Figure 5:
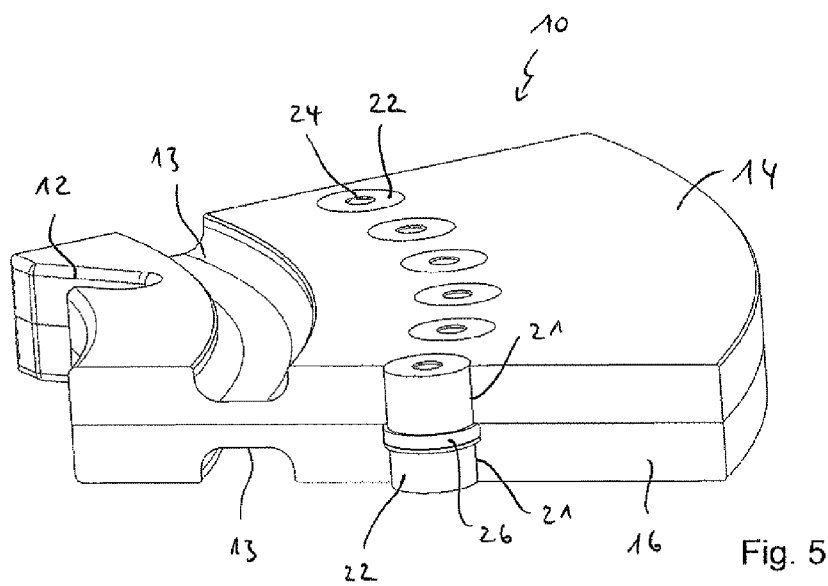
FIG. 5 shows a further perspective sectional view of the die segment from FIG. 1.
Figure 6:
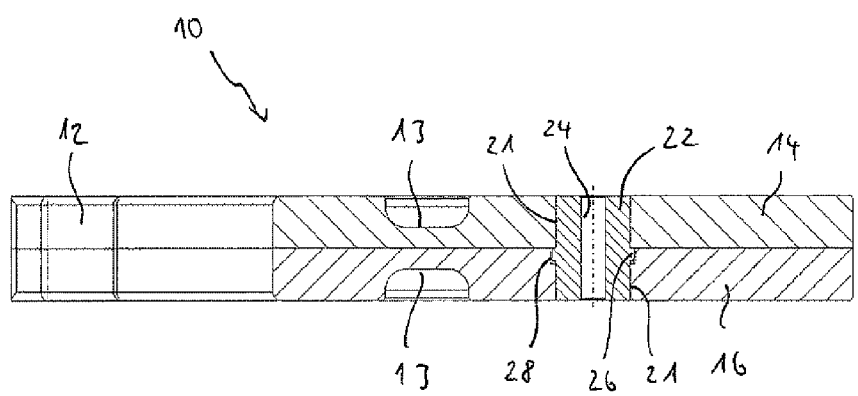
FIG. 6 shows a cross-sectional view of the die segment from FIG. 1.

Based on FIGS. 5 and 6, it should be explained how the die bushings 22 are arranged in the die segment 10. It can be discerned from FIGS. 5 and 6 that the die bushings 22 each show a tiered collar 26 running along their circumference. It can in particular be discerned from FIG. 6 that the boreholes 21 of the lower segment half 16 each have a tiered extension 28 on their ends assigned to the upper segment half 14. In the state of the segment halves 14, 16 being connected with one another, the collars 26 of the die bushings 22 are each incorporated into a tiered extension 28, in such a way that they are a form fit. As a result, the die bushings 22 are fixed between the segment halves 14, 16 in a form fit, in regard to which they are in particular secured against movement in an axial direction. It may, moreover, be provided for that the die bushings 22 show a spring key running in an axial direction or a groove running in an axial direction. In the die holes formed by the boreholes 21, either a corresponding axial groove or a corresponding axial spring key can be provided for, wherein the protrusions are each interlocked with a groove, so that the die bushings 22 are also secured against a rotation around their axes.

Figure 7:
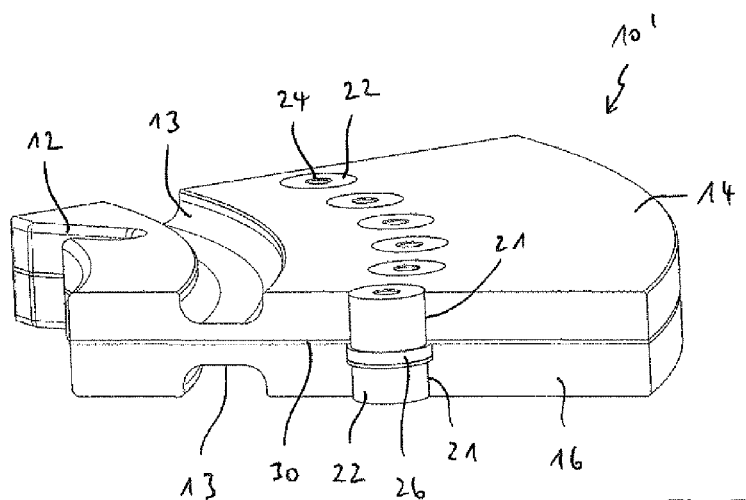
FIG. 7 shows a die segment of a die table according to the invention according to a second embodiment, represented in a perspective sectional view.

A second embodiment of a die segment 10' of a die table according to the invention shown in FIG. 7 is shown in a perspective sectional view in accordance with the view shown in FIG. 5. This die segment 10' largely corresponds to the die segment shown in FIGS. 1 to 6. In turn, the die bushings 22 each have a collar 26 running along their circumference, wherein the collars 26 are each incorporated into a corresponding tiered extension of the borehole 21 of the lower segment half 16 in a form-fit manner. In contrast, however, to the embodiment shown in FIGS. 1 to 6, a thin elastic intermediate layer 30 is provided for between the segment halves 14, 16. The intermediate layer likewise has boreholes, which align with the boreholes 21 of the segment halves 14, 16. The intermediate layer 30 may, for example, consist of plastic. It ensures that no undesired air gaps occur between the segment halves 14, 16 that are connected with one another in a force-closed manner via the screw joint.

Figure 8:
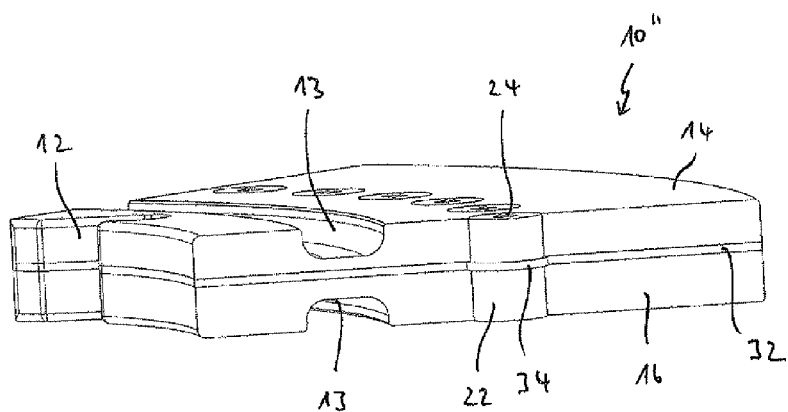
FIG. 8 shows a die segment of a die table according to the invention according to a third embodiment, represented in a perspective sectional view.

A third embodiment of a die segment 10" of a die table according to the invention is shown in FIG. 8 in a similar sectional view to the view shown in FIG. 7. This die segment 10" is also largely constructed identically to the die segment 10 shown in FIGS. 1 to 6. Just like the die segment 10' from FIG. 7, however, the die segment 10" according to FIG. 8 has an elastic intermediate layer 32 located between the upper and lower segment halves 14, 16. In that regard, the intermediate layer 32 in the embodiment according to FIG. 8 is somewhat thicker than the intermediate layer 30 in the embodiment in accordance with FIG. 7. The intermediate layer 32 may also, for example, consist of plastic, and fulfils the same function as the intermediate layer 30 from FIG. 7. In contrast to the embodiments from FIGS. 1 to 7, however, the embodiment according to FIG. 8 does not show any extensions for incorporating collars of die bushings 22 into one of the segment halves 14, 16. Instead, the boreholes of the intermediate layer 32 aligned with the boreholes 21 of the segment halves 14, 16 each have a greater diameter than the boreholes 21 of the segment halves 14, 16. In each case a collar 34 of the die bushings 22 that is, in this embodiment, of a narrower construction, is arranged, in a form-fit manner, in this extension of the diameter of the die holes formed by the intermediate layer 32.

Figure 9:
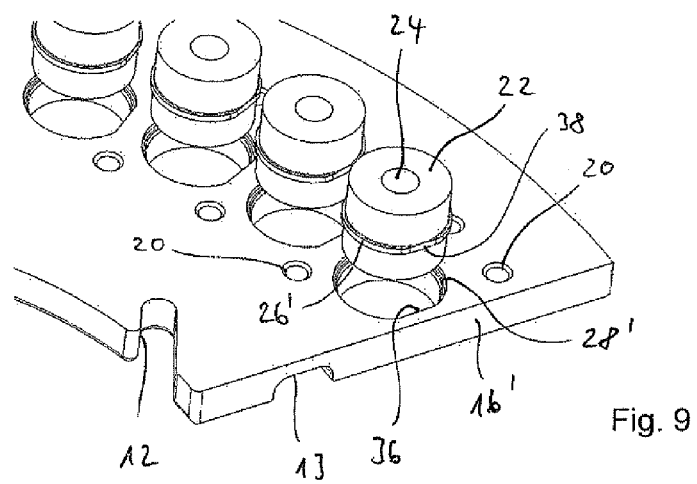
FIG. 9 shows a section of a segment half according to the invention according to a fourth embodiment, shown in a perspective view.

In FIG. 9 a lower segment half 16' in accordance with another embodiment is shown. It can, for example, be screwed together with the segment half 14 explained above through the boreholes 20. The segment half 16' largely corresponds to the segment half 16 explained above. Unlike the latter, the segment half 16', however, has receptacles 28', each featuring a flat portion 36 on its inner surface. The die bushings 22 each have a collar 26' with a corresponding flat portion 38 on its outer surface. Both the outer surface of the collar 26' and the inner surface of the receptacle 28' thus deviate sectionally from their circular form, and are thus not rotationally symmetrical. As a result, the die bushings 22 can only be inserted into the mounting holes in a predetermined turning position. When inserted, the interlocking flat portions 36, 38 ensure a form fit in the direction of rotation, which in turn prevents the die bushings 22 from rotating in the die holes.

With all the embodiments, the die bushings 22 are designed between the segment halves 14, 16, 16' in a form-fit manner in the way explained, and thus also secured for when very strong forces occur during operation. Through the die bushings being incorporated in a form-fit manner according to the invention, only very little space is required, in particular in the border region of the die segments. The manufacture and assembly as well as the cleaning are simplified, and it is possible to replace the die bushings 22 with other die bushings.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A die table for die bushings of a rotary tablet press, characterised in that the die table comprises two disc halves, an upper disc half and a lower disc half, that are connected with one another, each disc half having a plurality of holes (21), and which are aligned with one another when the two disc halves are connected with one another and thus form mounting holes in which one respective die bushing (22) is placed, wherein the die bushings (22) are held between the two connected disc halves in a form-fit manner and are protected against a movement in their axial direction by the form-fit, wherein the die bushings (22) each have a collar (26, 26') which is accommodated in a receptacle (28, 28') corresponding to the collar (26, 26'), further characterised in that the receptacles (28, 28') are each one formed by a tiered extension (28, 28') of the end of the holes (21) facing the other disc half and that are connected with one another facing the other disc half further wherein the die table is constructed of multiple die segments (10, 10', 10"), wherein the die segments are each formed out of multiple die halves (14, 16, 16') directly connected with one another, wherein each pair of die segment halves that are directly connected with one another (14, 16, 16') form a die segment (10, 10', 10").

2. The die table according to claim 1, characterised in that the receptacles (28, 28') are each located in at least one of the disc halves that are connected with one another.

3. The die table according to claim 1, characterised in that the disc halves are detachably connected with one another.

4. The die table according to claim 1, characterised in that the disc halves are connected with one another in a force-closed fashion.

5. The die table according to claim 4, characterised in that the disc halves are connected by means of a screw joint or a riveted connection.

6. The die table according to claim 1, characterised in that the disc halves are connected with one another in a bonded connection.

7. The die table according to claim 6, characterised in that the disc halves are connected by means of a welded connection.

8. The die table according to claim 1, characterised in that, moreover, means of preventing the die bushings (22) from rotating in the mounting holes are provided for.

9. The die table according to claim 8, characterised in that the exteriors of the die bushings (22) and the interiors of the mounting holes are each, at least sectionally, not rotationally symmetrical.

10. The die table according to claim 8, characterised in that at least one respective protrusion on the exteriors of the die bushings (22) running in an axial direction or at least one respective recess running in an axial direction is provided for, and that at least one respective recess running in an axial direction on the interiors of the mounting holes or at least one respective protrusion running in an axial direction is provided for, wherein said at least one protrusion and said at least one recess are interlocked with one another.

11. The die table according to claim 8, characterised in that a collar (26') of the die bushings (22) each has a flat portion (38) and that a receptacle (28') for the collar (26') of the die bushings (22) each at least has a corresponding flat portion (36).

* * * * *